United States Patent
Gusat et al.

(10) Patent No.: US 7,787,367 B2
(45) Date of Patent: Aug. 31, 2010

(54) METHOD AND A SYSTEM FOR FLOW CONTROL IN A COMMUNICATION NETWORK

(75) Inventors: Mircea Gusat, Langnau (CH); Cyriel Johan Agnes Minkenberg, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 1128 days.

(21) Appl. No.: 11/439,354

(22) Filed: May 23, 2006

(65) Prior Publication Data
US 2007/0274215 A1 Nov. 29, 2007

(51) Int. Cl.
*G01R 31/08* (2006.01)

(52) U.S. Cl. .................. 370/229; 370/235; 709/223

(58) Field of Classification Search ......... 370/229–236, 370/252–253, 411–419, 428–429, 468; 709/223–229
See application file for complete search history.

(56) References Cited

U.S. PATENT DOCUMENTS

| | | | | |
|---|---|---|---|---|
| 5,633,867 A | * | 5/1997 | Ben-Nun et al. | 370/399 |
| 5,825,748 A | * | 10/1998 | Barkey et al. | 370/236 |
| 6,219,713 B1 | * | 4/2001 | Ruutu et al. | 709/235 |
| 6,243,358 B1 | * | 6/2001 | Monin | 370/229 |
| 6,594,701 B1 | * | 7/2003 | Forin | 709/232 |
| 6,640,325 B1 | * | 10/2003 | Fischer | 714/748 |
| 2002/0004842 A1 | * | 1/2002 | Ghose et al. | 709/235 |

OTHER PUBLICATIONS

H.T. Kung and Robert Morris, Credit-Based Flow Control for ATM Networks, Apr. 1995, IEEE, pp. 40-48.*
H.T. Kung and Koling Chang, Reciever-Oriented Adaptive Buffer Allocation in Credit-Based Flow Control for ATM Networks, 1995, IEEE, pp. 239-252.*

* cited by examiner

*Primary Examiner*—Ricky Ngo
*Assistant Examiner*—Phuongchau B Nguyen
(74) *Attorney, Agent, or Firm*—Stephen C. Kaufman; Daryl Neff

(57) ABSTRACT

The present invention relates to a method and a system of flow control in a communication network. The method comprises determining if at least one sender buffer has a sufficient number of credits. The sufficient number of credits informs the sender buffer if the receiver buffer has an available buffer space corresponding to at least one data packet. The method further comprises transmitting the at least one data packet to at least one receiver buffer, if the at least one sender buffer has the sufficient number of credits. If the sufficient number of credits in the at least one sender buffer are absent, a data packet is transmitting speculatively to the at least one receiver buffer. If a negative acknowledgement is received for the transmitted data packet, a copy of the data packet can be retransmitted to the receiver buffer.

17 Claims, 4 Drawing Sheets

METHOD AND A SYSTEM FOR FLOW CONTROL IN A COMMUNICATION NETWORK

FIELD OF THE INVENTION

The present invention relates generally to communication networks and more specifically, to link-level protocols in communication networks.

BACKGROUND OF THE INVENTION

In lossless communication networks, a sender and a receiver communicate using link-level protocols. A link-level protocol may correspond to the direct communication of the sender with the receiver, and may include error-free, in-order and single-copy delivery of data packets.

Link-level protocols include a Link-Level Flow Control (LL-FC) protocol and a Link-Level Reliable Delivery (LL-RD) protocol. Each of the LL-FC protocol and LL-RD protocol are used over the same link during each communication instance between a sender and a receiver.

An LL-FC protocol achieves low-latency in delivery of data packets, losslessness, work conservation and efficiency during each communication instance. Losslessness enforces that a data packet is not dropped by the receiver owing to a lack of buffer space at a receiver. Work conservation enforces that the link used for each communication instance is not idle. Efficiency may include efficient use of resources such as bandwidth, power and buffer space.

An LL-RD protocol achieves reliability, which includes error-free, in-order, and single copy delivery by handling data corruption and loss owing to transmission errors in each communication instance. Data corruption and loss owing to transmission errors are detected by methods that include, but are not limited to, Forward Error Correction (FEC), and a Cyclic Redundancy Code (CRC). Further, these are handled by returning positive acknowledgements for successfully received data packets and negative acknowledgements for data packets that are corrupted, lost or out of order. Additionally, the sender stores a data packet until a positive acknowledgement is received. A stored data packet is dropped by the sender, if a positive acknowledgement is received corresponding to the packet. However, if a negative acknowledgement is received corresponding to a data packet, then the data packet is retransmitted. Traditionally, LL-FC is a link-level hardware function and LL-RD is handled by higher-level protocols or in software programs.

Existing LL-FC protocols, for example Credited Flow Control (CFC), employ conservative sending rules that guarantee storage of each data packet in a receiver buffer of a receiver. For example, in CFC protocol, data packets cannot be sent to the receiver if sufficient credits are not available at the sender. However, to achieve losslessness and work conservation, each receiver buffer of the receiver may need to be scaled proportionally to a product of a round-trip-time and a link bandwidth. The round-trip time is the latency of the flow-control loop, comprising the data-path time of flight from the sender to the receiver, the control-path time of flight from the receiver to the sender, and processing latencies at both the sender and the receiver. This may require additional speed, power and area, especially in applications where many receiver buffers are concentrated in a single device that must support strict quality of service (QoS) separation across many priorities or virtual lanes (VLs).

Moreover, as a data packet can only be sent if sufficient credits are available before transmitting the data packet, any delay in a FC loop can also induce a delay in the transmission of the data packet, thereby increasing latency in such lossless communication networks.

SUMMARY OF THE INVENTION

An object of the present invention is to provide a method and a system of flow control for reliable delivery of a plurality of data packets in a communication network.

In order to fulfill the above object, the method comprises determining if at least one sender buffer has a sufficient number of credits corresponding to a receiver buffer. The sender buffer corresponds to a sender and the receiver buffer corresponds to a receiver. The sufficient number of credits can inform the sender if the receiver buffer has an available buffer space to accommodate to at least one data packet.

In response to determining if a sender buffer has a sufficient number of credits, a data packet is transmitted to the receiver buffer, if the sender buffer has the sufficient number of credits. If the sufficient number of credits in the sender buffer is absent, the sender can transmit a data packet (if present) speculatively to the receiver buffer.

Upon reception of the packet, the receiver sends a positive acknowledgement or a negative acknowledgement corresponding to the transmitted data packet to the sender, indicating whether the packet has been received correctly. The positive acknowledgement or the negative acknowledgement can indicate whether the data packet was received error-free, in-order and single-copy. If the sender receives a negative acknowledgement, a copy of the data packet can be retransmitted so as to provide a reliable delivery of data packets.

The system includes a determining module for determining if a sender buffer has a sufficient number of credits. The system further includes a transmitting module for transmitting the data packet to the receiver buffer. The data packet is transmitted in a credited mode if the sender buffer has the sufficient number of credits and the data packet is transmitted in a speculative mode if the sender buffer does not have the sufficient number of credits.

The system further includes a retransmitting module. The retransmitting module retransmits a copy of the data packet if a negative acknowledgement for the data packet is received at the sender.

BRIEF DESCRIPTION OF THE DRAWINGS

The foregoing objects and advantages of the present invention for a method and a system flow control in communication networks may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION

Figure 1:
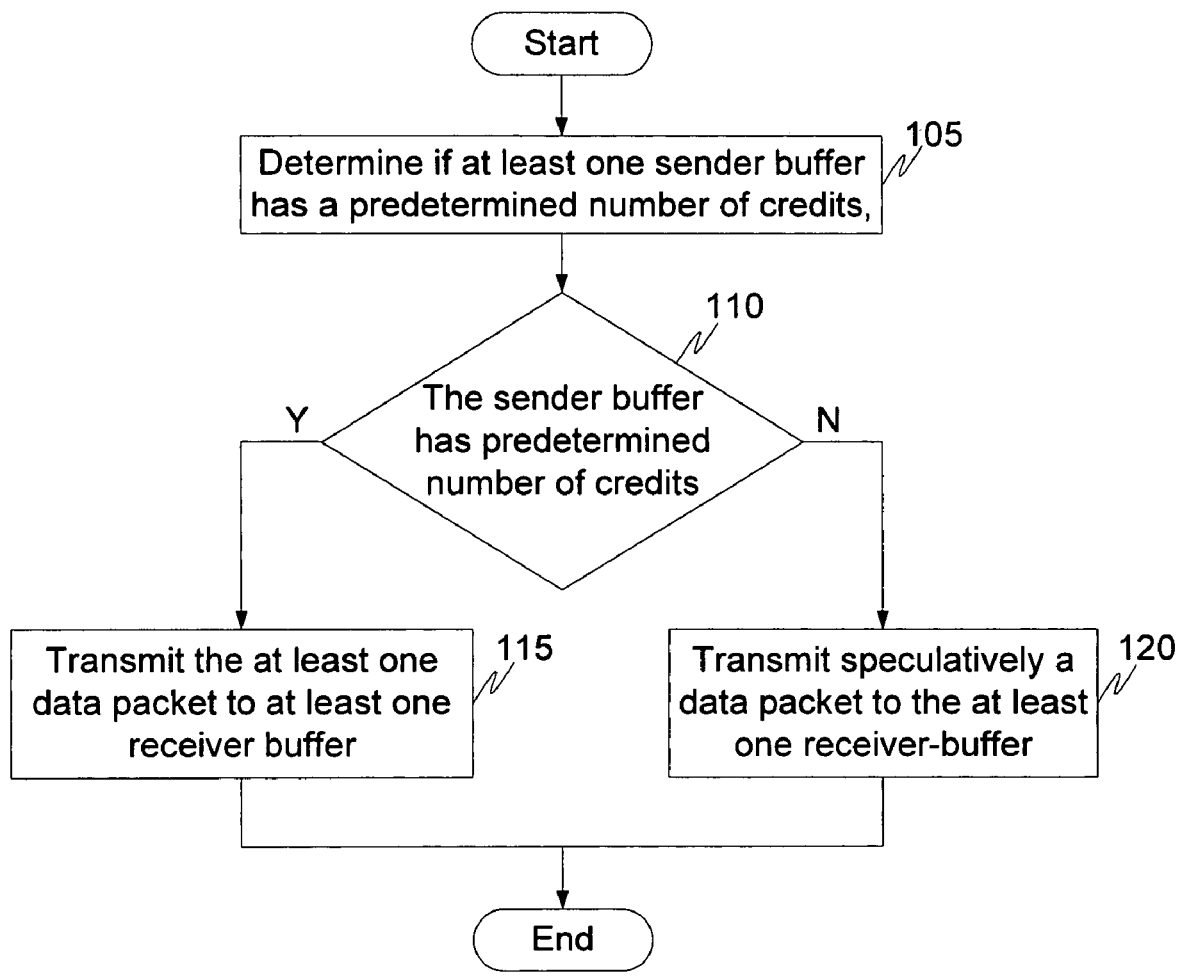
FIG. 1 illustrates a flow diagram of a method for flow control in a communication network, in accordance with an embodiment of the present invention.

Before describing in detail embodiments that are in accordance with the present invention, it should be observed that the embodiments reside primarily in combinations of method steps and system components related to flow control in communication networks. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or system that comprises, has, includes, contains a list of elements does not include only those elements but may include other elements not expressly listed or inherent to such process, method, article, or system. An element preceded by "comprises . . . a", "has . . . a", "includes . . . a", "contains . . . a" does not, without more constraints, preclude the existence of additional identical elements in the process, method, article, or system that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the present invention described herein may be comprised of one or more conventional processors and unique stored program instructions that control the one or more processors to implement, in conjunction with certain non-processor circuits, some, most, or all of the functions of the method and system for flow control in communication networks. The non-processor circuits may include, but are not limited to, a transceiver, signal drivers, clock circuits and power source circuits. As such, these functions may be interpreted as steps of a method for flow control in communication networks. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, the present invention relates to a link-level protocol in a communication network. However, the present invention can also apply to software communication at higher layers. A communication network involves exchange of data packets whereas software communication involves exchange of messages. Those skilled in the art will realize that a link-level refers to a one-to-one communication between a sender and a receiver. In a communication network, the sender and the receiver can be, for instance, switching units of a switching fabric.

Referring now to figures, and in particular FIG. 1, a flow diagram of a method for flow control in a communication network is shown, in accordance with an embodiment of the present invention. The present invention combines a credited mode of transmission with a speculative mode of transmission at the link-level. For example, a sender can send a data packet to a receiver in a credited mode, if the sender knows that the receiver can accommodate the data packet or in a speculative mode if the sender knows that the receiver cannot accommodate the data packet. Those skilled in the art will appreciate that there is a latency in transmission of a data packet between sender and receiver and vice versa. This latency is due to the round-trip time that includes the flow-control loop, comprising the data-path time of flight from the sender to the receiver, the control-path time of flight from the receiver to the sender, and processing latencies at both the sender and the receiver. Due to the latency a number of data packets transmitted to the receiver as well as credits issued to the sender may be in flight at any point in time. Hence, in general, the sender does not accurately know if the receiver can accommodate a data packet or not. Therefore, a data packet is sent in the speculative mode if according to the sender, the receiver cannot accommodate the packet. The credited mode is also known in the art as a conservative mode or a proactive mode and the speculative mode is also known in the art as an uncredited mode. The method described in FIG. 1 gives precedence to the credited mode of transmission over the speculative mode of transmission.

The sender can have a plurality of sender buffers. The receiver can also have a plurality of receiver buffers. Those skilled in the art will realize that the receiver buffers can store a plurality of data packets temporarily. The receiver buffers can correspond to, for example, virtual channels or different destination ports. Additionally, in an embodiment of the present invention, the sender may maintain a separate sender buffer corresponding to every receiver buffer to prevent head-of-line blocking. However, those skilled in the art will realize that any number of sender buffers and any arrangement of the sender buffers are within the scope of the present invention.

Those skilled in the art will realize that every receiver buffer may not be needed to be scaled proportionally to a product of a round-trip-time and a link bandwidth, as is done conventionally. More specifically, if there are a plurality of receiver buffers at the receiver and the product of the round-trip-time and the bandwidth is larger than the minimum size of a data packet being transmitted by the sender, there is a net reduction in an aggregate size of the receiver buffers. Therefore, in accordance with the present invention, a data packet can be transmitted to a receiver even when there are insufficient credits.

The sender and the receiver can communicate with each other over a bi-directional channel. The bi-directional channel can comprise a downstream channel and an upstream channel. The upstream channel can carry flow control messages from the receiver to the sender and the sender can transmit data packets to the receiver on the downstream channel. For instance, the receiver can issue credits, which correspond to a receiver buffer, to the sender over the upstream channel. The credits can inform a sender buffer corresponding to the receiver buffer about an available buffer space at the receiver buffer.

A sender buffer can transmit a data packet, which is destined for, say, a destination port, to a receiver buffer corresponding to the destination port. The data packet can be transmitted over the downstream channel. However, in accordance with the present invention, before transmitting a data packet, it is determined if at least one sender buffer has a sufficient number of credits at step 105. The sufficient number of credits corresponds to a receiver buffer and informs the sender buffer if the receiver buffer has an available buffer space to accommodate at least one data packet. The sender can have a credit count corresponding to a receiver buffer where the number of credits available in the receiver buffer can be stored. Those skilled in the art will realize that the sender can maintain a separate credit count for each receiver buffer. The credit count at the sender buffer may be implicit, for instance in case of a fixed-size cell switching, or the credit count may be implicitly included in the credits issued by the receiver.

If the credit count implies that the sender buffer has at least the sufficient number of credits to accommodate a data packet, the data packet is transmitted to the receiver buffer at step 110. Such a transmission, where data packets are transmitted when the receiver buffer can accommodate the data packets, is known as the credited mode of transmission. Data packets transmitted in the credited mode are herein referred to as credited-data packets.

However, if, at step 105, it is determined that the sender buffer does not have the sufficient number of credits, a data packet is speculatively transmitted to the receiver buffer at step 115. Such a transmission, where data packets are transmitted to the receiver buffer, despite the sender buffer not having sufficient number of credits, is known as the speculative mode of transmission. Data packets transmitted in the speculative mode are herein referred to as speculative-data packets. In an embodiment of the present invention, a data packet can be transmitted in the speculative mode at most once so as to avoid performance degradation.

Those skilled in the art will realize that the method of FIG. 1 gives precedence to the credited mode of transmission over the speculative mode of transmission. It is determined if a data packet can be transmitted in the credited mode at step 105 before transmitting the data packet in the speculative mode at step 115. Moreover, those skilled in the art will realize that the sender is eligible to perform transmission in the speculative mode if and only if the sender has no non-empty sender buffers for which there are sufficient credits available. Therefore, transmission in the speculative mode is performed only if transmission in the credited mode is not possible.

When the data packet is transmitted, either in the credited mode or in the speculative mode, the sender buffer assumes that the data packet is accommodated in the receiver buffer. Therefore, the credit count corresponding to the sender buffer is decreased by a sufficient number corresponding to the data packet when the data packet is transmitted to the receiver buffer. This means that the sufficient number of credits corresponding to the data packet is consumed even though there may be no available buffer space in the receiver buffer. Decreasing the credit count when a data packet is transmitted is known as a conservative credit policy.

Those skilled in the art will realize that the conservative credit policy can result in the credit count being negative. Upon transmission of a data packet, the credit count is decremented by a sufficient number of credits corresponding to the data packet. If the credit count is greater than or equal to zero after decrementing the credit count, the data packet is a credited-data packet. On the other hand, if after decrementing the credit count by the sufficient number of credits the credit count is less than zero, the data packet is a speculative-data packet. Any sender buffer, for which the credit count is zero or less than zero, can only perform speculative transmissions. Therefore, all credited-data packets are guaranteed not to be dropped because of full receiver buffers. Also, a data packet may not be explicitly required to be marked as a credited-data packet or a speculative-data packet.

After the data packet is transmitted to the receiver, either in the credited mode or in the speculative mode, a positive acknowledgement or a negative acknowledgement corresponding to the data packet can be received at the sender. The positive acknowledgement for the data packet can be received when the data packet is removed from the receiver buffer and transmitted further to a next receiver. On the other hand, the negative acknowledgement is sent when the data packet is dropped by the receiver. The data packet can be dropped by the receiver, for instance due to the receiver buffer being full or the data packet being out-of-order or the data packet being corrupted. In an embodiment of the present invention, if a data packet is received out-of-order, the receiver can accept the data packet instead of discarding the data packet. The receiver can re-sequence the out-of-order data packet on a per-flow basis to maintain an in-order state. Re-sequencing at the receiver may reduce the number of retransmissions, but at the cost of having re-sequencing buffers and a logic for re-sequencing at the receiver. If the re-sequencing is performed successfully, the receiver can transmit the data packet to a next receiver and can then send a positive acknowledgement to the sender buffer.

Moreover, when the receiver receives a data packet for which a receiver buffer is full, the receiver can select one or more data packets to be dropped according to a packet dropping policy. In an embodiment of the invention, a packet dropping policy can be dropping an incoming data packet. However, those skilled in the art will realize that the data packet selected to drop may be any data packet in the receiver buffer. For example, conventionally, in buffer sharing among a plurality of prioritized data packets, low priority data packets can hog a receiver buffer and can prevent higher priority data packets from entering the receiver buffer. In accordance with the present invention, the low priority data packets can be dropped and replaced with higher priority data packets. Copies of the low priority data packets can be retransmitted from the retransmission buffer in the sender. However, this may require the retransmission buffer to be larger than the receiver buffer, otherwise hogging may happen at the sender.

In an embodiment of the present invention, any data packet, which is awaiting a positive acknowledgement or a negative acknowledgement, is not eligible for transmission in the speculative mode. Only data packets that are not yet transmitted are eligible for transmission in the speculative mode. This is because if a data packet awaiting the positive acknowledgement or the negative acknowledgement is transmitted speculatively, the receiver buffer can receive the data packet twice and can cause an error.

The positive acknowledgement and the negative acknowledgement can comprise an identification number corresponding to the data packet so that the sender knows that the positive acknowledgement or the negative acknowledgement corresponds to the data packet. When a positive acknowledgement or a negative acknowledgement corresponding to the data packet is received at the sender, the sender knows that the data packet in the receiver buffer is removed from the receiver buffer and further transmitted to a next receiver or is dropped. This may imply that the receiver buffer, now, has a vacant available buffer space corresponding to the data packet. Therefore, upon receiving the positive acknowledgement or the negative acknowledgement from the receiver, the sender buffer increases its credit-count by the sufficient number.

Therefore, those skilled in the art will realize that the credits are conveyed implicitly by the positive acknowledgement or the negative acknowledgement instead of being communicated explicitly. A receiver buffer returns a positive acknowledgement when a data packet is removed from the receiver buffer and is transmitted to a next receiver. Therefore a positive acknowledgement implies that the receiver buffer now has available buffer space corresponding to the data packet transmitted by the receiver buffer. Hence, the credit count is incremented by the sufficient number of credits corresponding to the data packet. However, a negative acknowledgement is returned when a packet is dropped. Therefore, a negative acknowledgement implies incrementing the credit count by the predefined number for the dropped data packet.

For example, when a sender buffer transmits a data packet to a receiver buffer, either in a credited mode or in a speculative mode, a credit count of the sender buffer is decreased by a predefined number corresponding to the data packet. If the sender receives a negative acknowledgement corresponding to the data packet, the sender knows that the data packet is dropped by the receiver buffer. Therefore, the sender buffer increases its credit count by the predefined number.

In an embodiment of the present invention, a copy of the data packet is stored in the sender buffer before transmitting the data packet to the receiver. The data packet can be a credited-data packet or a speculative-data packet. If the receiver drops the data packet, the copy of the data packet can be retrieved from the sender buffer and can be stored in a retransmission buffer corresponding to the sender buffer. The copy of the data packet can then be retransmitted from the retransmission buffer.

In an alternate embodiment, the copy of the data packet is stored directly in a retransmission buffer corresponding to the sender buffer before transmitting the data packet to the receiver. Therefore, those skilled in the art will realize that the sender can transmit the data packet only if the retransmission buffer is not full. If the data packet is dropped by the receiver, the retransmission buffer retransmits the copy of the data packet to the receiver buffer. In accordance with an embodiment of the present invention, retransmission of copies of data packets can be performed only in the credited mode so as to avoid performance degradation.

Therefore, copies of all data packets remain stored in the sender, either in the sender buffers or in the retransmission buffers, until positive acknowledgements or negative acknowledgements corresponding to the data packets are received. This holds true for speculative-data packets as well as for credited-data packets, even though a credited-data packet cannot be dropped because of the receiver buffer being full. However, storing copies of the credited-data packets can cover other sources of data packet loss, such as out-of-order delivery and unrecoverable transmission errors. Therefore, the present invention also deals with causes of data packet loss that are independent of the link-level protocol.

In an embodiment of the present invention, the packets at the sender can be partitioned into unsent data packets and awaiting-acknowledgement data packets. Awaiting-acknowledgement data packets are data packets that are transmitted to the receiver but are awaiting a positive acknowledgement or a negative acknowledgement. Each awaiting-acknowledgement data packet can be a speculative-data packet or a credited-data packet. The awaiting-acknowledgement data packets can comprise, but are not restricted to, unacknowledged data packets and negatively acknowledged data packets. A data packet is an unacknowledged data packet when a positive acknowledgment or a negative acknowledgment corresponding to the data packet has not been received at the sender. Negatively acknowledged data packets, on the other hand, are data packets that have received a negative acknowledgement.

The sender can assign a high priority to the negatively acknowledged data packets, a medium priority to the unsent data packets and a low priority to the unacknowledged data packets. A data packet is chosen for transmission based on the priority assigned to the data packet. Further, in an embodiment of the present invention, a reliable delivery of the speculative-data packets is prioritized, since speculative-data packets have a high probability of loss. As credited-data packets can mostly be lost due to a physical-level error, which are assumed to be rare, the credited-data packets can also be given the lowest priority. Moreover, a predetermined time interval is associated with all data packets to ensure that the data packets do not have to wait forever if a positive acknowledgement or a negative acknowledgement corresponding to the data packet is not received. Data packets that do not receive a positive acknowledgement or a negative acknowledgement for the predetermined time interval can be considered as negatively acknowledged.

In another embodiment of the present invention, the sender chooses a data packet for transmission based on a predetermined policy, such as an oldest-cell-first policy or a round robin policy. The data packet can be a credited-data packet or a speculative-data packet. In yet another embodiment, a user chooses the data packets that can be transmitted in the speculative mode and the data packets that can be transmitted in the credited mode.

Figure 2A:
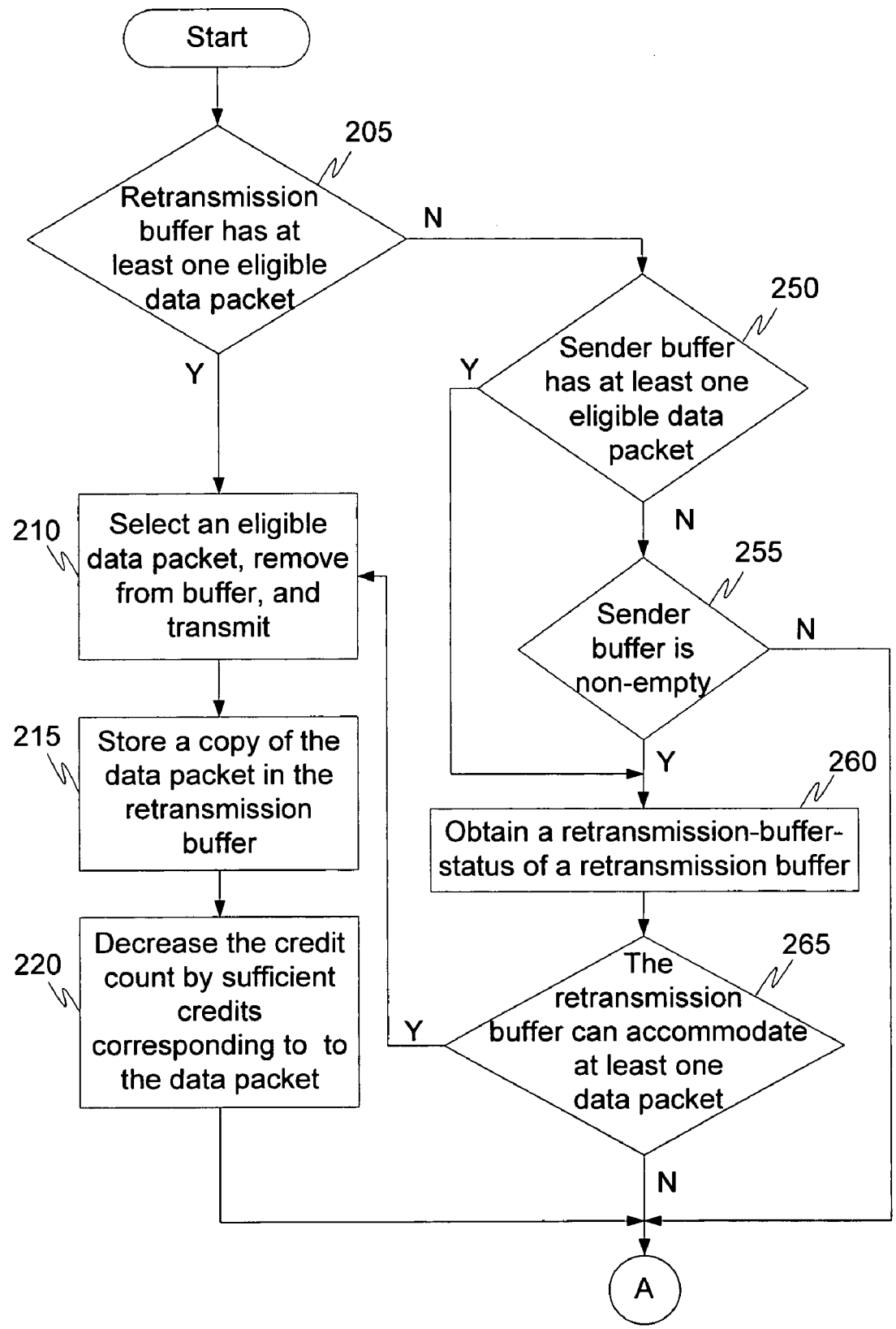
FIG. 2A and FIG. 2B illustrate a flow diagram of a method of flow control for reliable delivery of a plurality of data packets in a communication network, in accordance with an embodiment of the present invention.
Figure 2B:
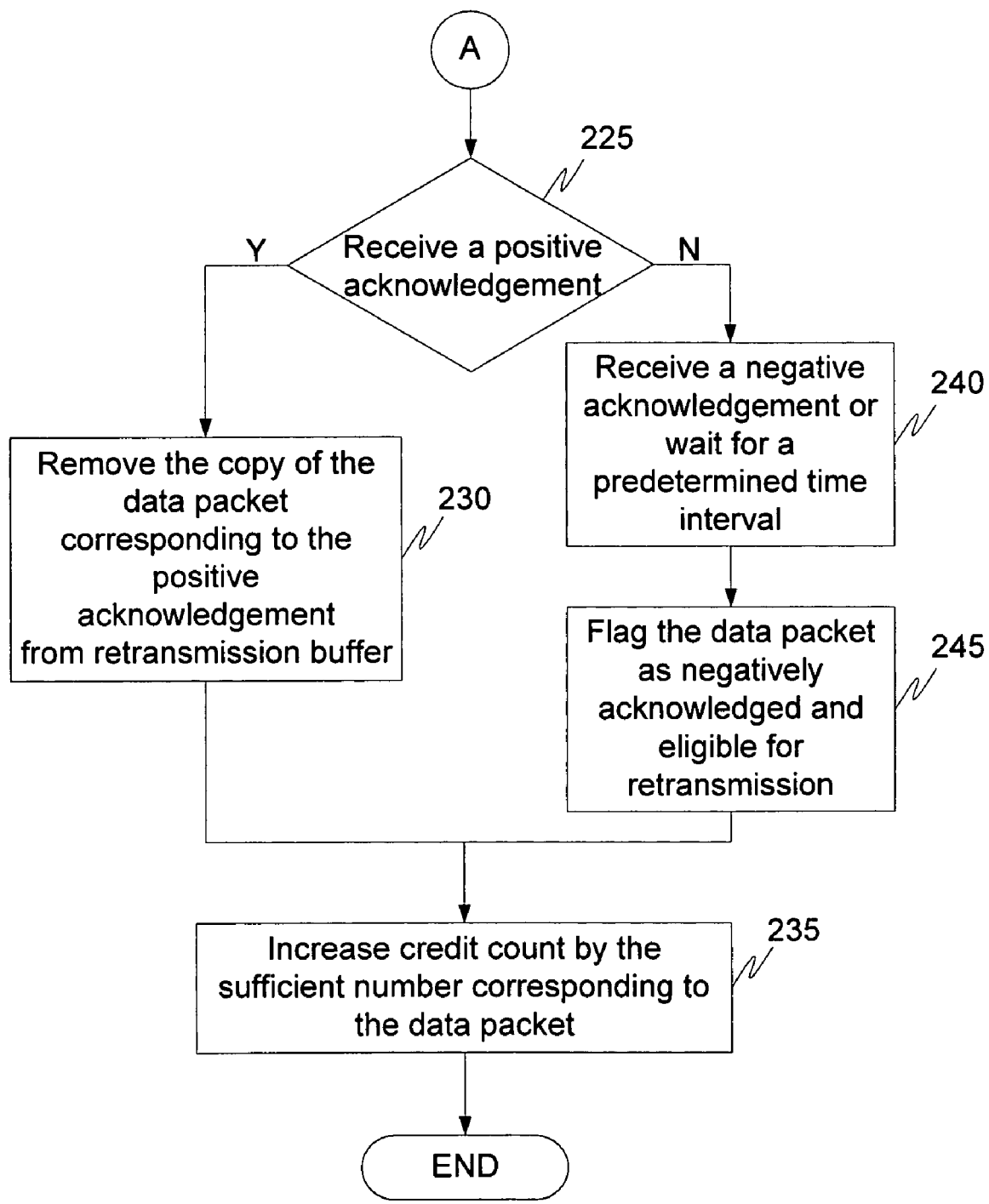

FIG. 2A and FIG. 2B illustrate a flow diagram of a method of flow control for reliable delivery of a plurality of data packets in a communication network, in accordance with an embodiment of the present invention. The method of FIG. 1 describes various embodiments to transmit a data packet from a sender buffer in a sender to a receiver buffer in a receiver. However, the data packet can be dropped by the receiver, for instance due to the receiver buffer being full or the data packet being out-of-order or the data packet being corrupted. If a copy of the data packet is not stored, the data packet can be lost forever. To ensure a reliable and a lossless delivery of data packets, the embodiment described in FIG. 2A and FIG. 2B enables a copy of a data packet to be stored in a retransmission buffer before the data packet is transmitted to the receiver buffer. Each sender buffer can have a corresponding retransmission buffer.

Turning now to FIG. 2A, it is checked if the retransmission buffer has at least one eligible data packet at step 205. A data packet is an eligible data packet if and only if sufficient number of credits corresponding to the receiver buffer are present at the sender buffer. Those skilled in the art will realize that a credited-data packet is an eligible data packet. A credited-data packet can be transmitted from the retransmission buffer to avoid performance degradation. Moreover, the data packet in the retransmission buffer is eligible when the data packet is expired or is negatively acknowledged. Each data packet can have a predetermined time interval associated with it. A data packet expires if a positive acknowledgement or a negative acknowledgement corresponding to the data packet is not received in the predetermined time interval. If the retransmission buffer has at least one eligible data packet, the eligible data packet is selected and removed from the retransmission buffer and transmitted to the receiver buffer at step 210. A copy of the data packet is stored in the retransmission buffer at step 215, so that the data packet can be recovered in case of failed transmission. In an embodiment of the present invention, a timestamp is associated with each data packet in the retransmission buffer. The timestamp can be the time that a data packet departed from the sender.

Since the data packet is an eligible data packet, the sender assumes that the data packet can be accommodated in the receiver buffer. This implies that an available buffer space corresponding to the data packet is occupied by the data packet at the receiver buffer. Thus, the sender buffer decreases a credit count by a sufficient number of credits corresponding to the data packet at step 220. As mentioned earlier, the receiver buffer issues credits to the sender buffer, and the sender buffer keeps a corresponding credit count. The credit count at the sender buffer informs the sender buffer of the available buffer space at the receiver buffer. The sufficient number of credits are the minimum number of credits required by the data packet to accommodate in the receiver buffer.

Moving to FIG. 2B, once the eligible data packet is transmitted to the receiver buffer from the retransmission buffer, the sender waits for a positive acknowledgement. The positive acknowledgement for the data packet can be received when the receiver buffer removes the data packet from the receiver buffer and the data packet is transmitted further to a next receiver. If at step 225, a positive acknowledgement is received, it implies that the receiver buffer has successfully transmitted the data packet to a next receiver. At step 230, the copy of the data packet stored in the retransmission buffer is removed since the data packet is transmitted successfully to the receiver. Also, receiving a positive acknowledgement means that the data packet is further transmitted by the receiver buffer. Thus, upon receiving the positive acknowledgment, the sender knows that the available buffer space is empty at the receiver buffer. Consequently, the sender buffer increases the credit count by the sufficient number of credits corresponding to the data packet at step 235.

However, if a positive acknowledgement is not received at step 225, the sender either receives a negative acknowledgement or the sender waits for a predetermined time interval for a positive acknowledgement or a negative acknowledgement to arrive, at step 240. The negative acknowledgement can be received if the data packet is dropped by the receiver. The data packet can be dropped, for instance due to the receiver buffer being full or the data packet being out-of-order or the data packet being corrupted. If a positive acknowledgement or a negative acknowledgement corresponding to a data packet is not received in a predetermined time interval after a timestamp associated with the data packet, the data packet is considered expired. The predetermined time interval can be assigned a conservative value to prevent unnecessary bandwidth-wasting retransmissions. At step 245, the data packet, which receives a negative acknowledgement or does not receive a positive acknowledgement or a negative acknowledgement in the predetermined time interval, is flagged as a negatively acknowledged data packet. As mentioned earlier, a negatively acknowledged data packet is eligible for retransmission. Since a negative acknowledgement means the data packet is not received at the receiver buffer successfully, the sender knows that the available buffer space corresponding to the data packet is empty at the receiver buffer. Hence, the credit count at the sender is increased by a sufficient number of credits corresponding to the data packet at step 235.

Now, referring back to FIG. 2A, if at step 205, the retransmission buffer does not have even one eligible data packet, at step 250 it is checked if the sender buffer has at least one eligible data packet. If the sender buffer does not have an eligible data packet, it is checked if the sender buffer is non-empty at step 255. The sender buffer is non-empty if the sender buffer has one or more data packet. Before transmitting a data packet from the sender buffer, a retransmission-buffer-status of the retransmission buffer is obtained at step 260. The retransmission-buffer-status can be an available buffer space in the retransmission buffer. Using the retransmission-buffer-status, the sender determines if the retransmission buffer can accommodate the data packet at step 265. Also, the retransmission-buffer-status is obtained at step 260 if the sender buffer has one or more eligible data packet at step 250.

Now, if, at step 265, the retransmission buffer can accommodate the data packet, an eligible data packet is selected and removed from the sender buffer and transmitted to a receiver buffer at step 210. The data packet is then stored in the retransmission buffer at step 215. Since the sender buffer transmits the data packet to the received buffer, the credit count is decreased by the sufficient number of credits corresponding to the data packet at step 220. Thereafter, the method step continues from step 225.

Moreover, if the sender buffer is empty or if the retransmission buffer cannot accommodate a data packet, the sender buffer waits for one of a positive acknowledgement, a negative acknowledgement and a predetermined time interval. Thereafter, the method continues from step 225.

Figure 3:
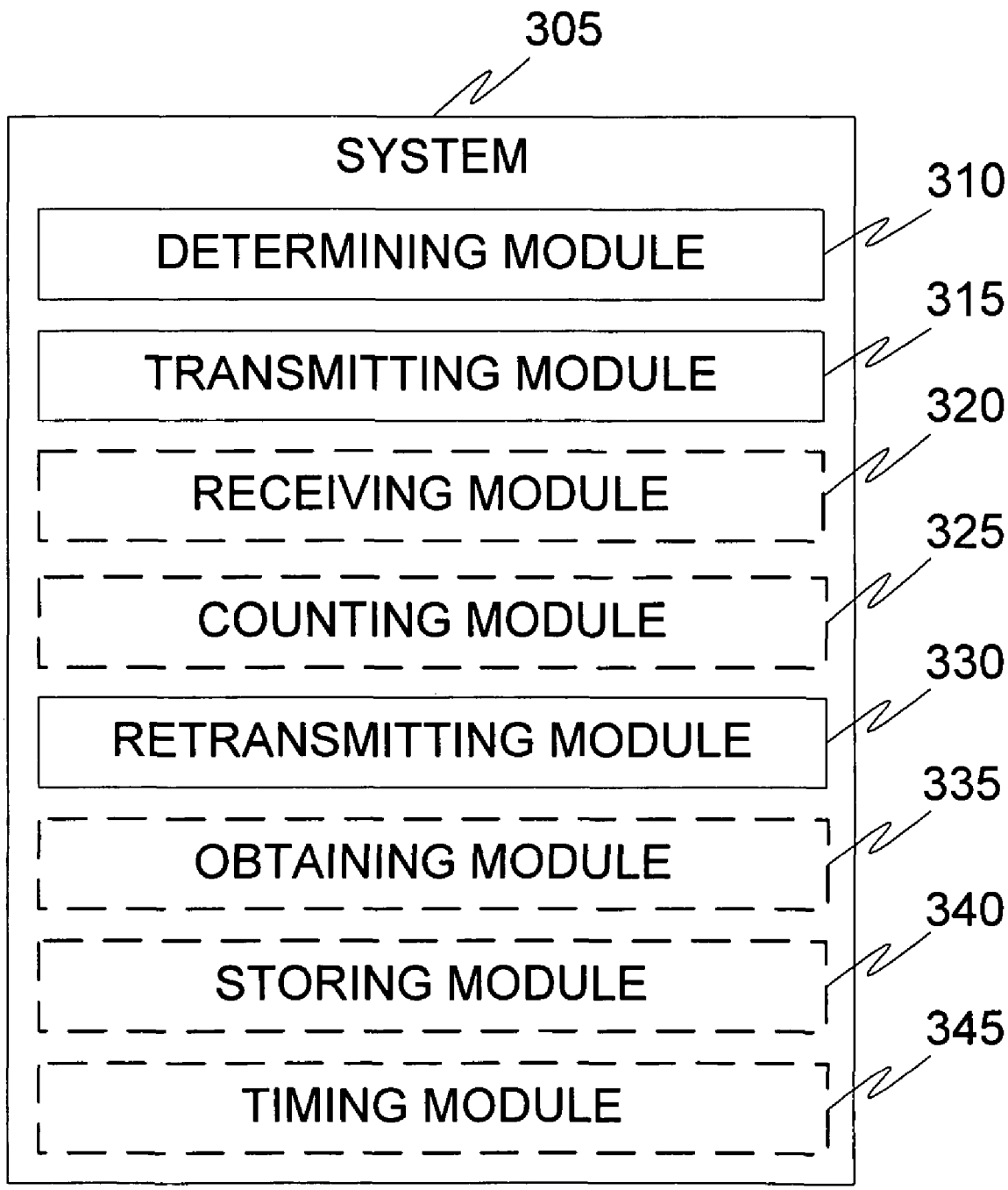
FIG. 3 illustrates a block diagram of a system for flow control in a communication network, in accordance with an embodiment of the present invention.

Turning now to FIG. 3, a block diagram of a system 305 for flow control in a communication network is shown in accordance with an embodiment of the present invention. The communication network can comprise a plurality of senders and a plurality of receivers. Those skilled in the art will realize that in a communication network, a sender is a receiver when the sender receives a data packet and a receiver is a sender when the receiver sends a data packet to a next receiver. In an embodiment of the present invention, a sender can be in communication with a receiver over a bi-directional channel. The sender can send data packets to the receivers over a downstream channel and the receiver can send flow control messages to the sender over an upstream channel. The receiver can act as a sender and can forward the data packets further to a next receiver. The sender can have a plurality of sender buffers and the receiver can have a plurality of receiver buffers corresponding to a plurality of destination ports. A data packet, which is destined for a particular destination port, can be transmitted from a sender buffer to a receiver buffer corresponding to the destination port.

System 305 can be a software program or a combination of hardware components and software programs. System 305 can reside on the sender or on a central server of the communication network. System 305 can enable the communication network to implement a link-level protocol, which facilitates a reliable and a lossless delivery of data packets and a low latency for delivery of the data packets. System 305 can comprise a determining module 310. Determining module 310 can determine if at least one sender buffer has a sufficient number of credits corresponding to a receiver buffer. The sender buffer and the receiver buffer can both correspond to a same destination port. As mentioned earlier, the sufficient number of credits inform the sender buffer if the receiver buffer has an available buffer space for at least one data packet.

Further, system 305 comprises a transmitting module 315. Determining module 310 can inform transmitting module 315 if the sender buffer has the sufficient number of credits. If the sender buffer has the sufficient number of credits, it implies that the receiver buffer can accommodate the data packet. Therefore, transmitting module 315 can transmit a data packet from the sender buffer to the receiver buffer. Transmitting a data packet when a receiver can accommodate the data packet is known as a credited mode of transmission. The data packets that are transmitted in the credited mode of transmission are herein referred to as credited-data packets.

If determining module 310 determines that the sender buffer does not have the sufficient number of credits, it implies that the receiver buffer cannot accommodate a data packet. However, as mentioned earlier, there is a latency in transmission of a data packet between the sender and the receiver and vice versa. Due to this latency or the round-trip time a number of data packets transmitted to the receiver as well as credits issued to the sender may be in flight at any point in time. Hence, in general, the sender does not accurately know if the receiver can accommodate a data packet or not. Thus, transmitting module 315 transmits the data packet speculatively to the receiver buffer. Transmitting a data packet when a receiver cannot accommodate a data packet is known as a speculative mode of transmission. The data packets that are transmitted in the speculative mode of transmission are herein referred to as speculative-data packets.

System 305 can also comprise a receiving module 320 that can receive either a positive acknowledgment or a negative acknowledgement for the transmitted data packet. A positive acknowledgement implies that the data packet has been received successfully at the receiver and is further transmitted by the receiver to a next receiver. A negative acknowledgement implies that the data packet is dropped by the receiver. The data packet can be dropped by the receiver, for instance due to the receiver buffer being full or the data packet being out-of-order or the data packet being corrupted.

When a positive acknowledgement or a negative acknowledgement corresponding to a data packet is received by receiving module 320, it implies that the data packet is either transmitted further by the receiver buffer or the data packet has been dropped by the receiver. A counting module 325 increases a credit count corresponding to the receiver buffer by a sufficient number of credits corresponding to the data packet if any one of the positive acknowledgement or a negative acknowledgement for the data packet is received. The number of credits available in the receiver buffer can be stored in the credit count. Those skilled in the art will realize that the sender can maintain a separate credit count for each receiver buffer. The credit count at the sender buffer may be implicit, for instance in case of a fixed-size cell switching, or the credit count may be explicitly included in the credits issued by the receiver.

Moreover, when a data packet is transmitted from the sender buffer, either in the credited mode or in the speculative mode, the sender assumes that the data packet is received by the receiver. Therefore, the credit count at the sender buffer is decreased by the sufficient number of credits corresponding to the data packet.

In an embodiment of the present invention, a timestamp can be associated with each data packet at the sender. The timestamp can be a time when the data packet departed from the sender. If a positive acknowledgement or a negative acknowledgement corresponding to a data packet is not received for a predetermined time interval after a timestamp associated with the data packet, the data packet is considered expired. The predetermined time interval can be assigned a conservative value to prevent unnecessary, bandwidth-wasting retransmissions. An expired data packet is considered to be negatively acknowledged.

Now, if a negative acknowledgement corresponding to the data packet is received at receiving module 320, it implies that the data packet is dropped at the receiver. A data packet that is negatively acknowledged, for instance because a negative acknowledgment is received or because a positive acknowledgement or a negative acknowledgement was not received for the predetermined time interval after the timestamp, becomes eligible for retransmission. A retransmitting module 330 can retransmits the data packet to the receiver buffer.

In an embodiment of the present invention, a copy of the data packet is stored at the sender buffer before transmitting the data packet. If a negative acknowledgement is received at receiving module 320, the copy of the data packet is marked as negatively acknowledged. Retransmission module 330 then retransmits the copy of the data packet to the receiver buffer. Those skilled in the art will appreciate that retransmission can be done in the credited mode to avoid performance degradation. If a positive acknowledgement for the data packet is received at receiving module 320, it implies that the data packet is transmitted further by the receiver. Hence, the copy of the data packet can be discarded from the sender buffer.

In another embodiment of the present invention, before transmitting the data packet, a copy of the data packet is stored in a retransmission buffer corresponding to the sender buffer instead of storing the copy in the sender buffer. In this embodiment, it is essential that the retransmission buffer is not full. To ensure that the retransmission buffer is not full, in an embodiment of the present invention, system 305 comprises an obtaining module 335. Obtaining module 335 obtains a retransmission-buffer-status of the retransmission buffer before transmitting the data packet. The retransmission-buffer-status is an available buffer space in the retransmission buffer. If the retransmission-buffer-status implies that the retransmission buffer can accommodate a copy of the data packet, the data packet can be transmitted to the receiver buffer by transmitting module 315. A storing module 340 can store a copy of the data packet in the retransmission buffer in response to transmitting the data packet. If a negative acknowledgement for the data packet is received at receiving module 320, the copy of the data packet can be retransmitted from the retransmission buffer. If a positive acknowledgement for the data packet is received at receiving module 320, the copy of the data packet can be discarded from the retransmission buffer.

In an embodiment of the present invention, retransmission module 330 can comprise a timing module 345. Timing module 345 can associate a predetermined time interval to each data packet stored in the retransmission buffer. Those skilled in the art will appreciate that a timestamp can be associated to each data packet in the sender. If a positive acknowledgement or a negative acknowledgement corresponding to the data packet is not received by receiving module 320 for the predetermined time interval after the timestamp, the data packet is considered to be expired. The copy of the data packet can then be retransmitted from the retransmission buffer after the predetermined time interval. This timeout mechanism ensures that the system can cope with lost data packets, and lost or corrupted positive acknowledgements and negative acknowledgements.

Various embodiments of the present invention provide a method and a system for flow control in a communication network. The present invention introduces a new LL-FC scheme. The present invention allows a significant reduction of an overall buffer size in case there are multiple independently flow-controlled receiver buffers in the receiver as compared to credit-based FC and grant-based FC. The present invention also allows a buffer sharing among different traffic priorities without causing priority inversion. More generally, the present invention allows the replacement of previously sent data packets by new data packets. Moreover, the present invention reduces latency.

Specifically, the present invention also integrates an LL-FC protocol and an LL-RD protocol into a single coherent and efficient protocol that can incur lower overheads than a combination of independent LL-FC protocol and LL-RD protocol. The present invention introduces an element of speculation in LL-FC and provides losslessness dynamically by means of retransmissions rather than statically by a strictly conservative transmission policy. Simultaneously, high efficiency is also achieved by giving preference to the conservative mode (credited mode) over the speculative mode.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for flow control in a communication network, the method comprising:
    a. determining if at least one sender buffer of a plurality of sender buffers has a sufficient number of credits, wherein the sufficient number of credits correspond to a receiver buffer of a plurality of receiver buffers, the sufficient number of credits informing if the receiver buffer has an available buffer space corresponding to at least one data packet, a sender buffer corresponds to a sender, the receiver buffer corresponds to a receiver;
    b. transmitting the at least one data packet to at least one receiver buffer, if the at least one sender buffer has the sufficient number of credits, the at least one data packet being transmitted from the at least one sender buffer, the at least one data packet being a credited-data packet;
    receiving one of a positive acknowledgement and a negative acknowledgement at the sender, wherein the positive acknowledgement is received when the receiver removes a data packet from the at least one receiver buffer, the negative acknowledgement is received when the data packet is dropped by the receiver, wherein each of the positive acknowledgement and the negative acknowledgement comprises an identification number corresponding to the data packet and a high priority is assigned to the negatively acknowledged data packets for retransmission while a medium priority is assigned to the unsent data packets and a low priority is assigned to the unacknowledged data packets; and
    c. transmitting speculatively a data packet to the at least one receiver buffer, if the sufficient number of credits in the at least one sender buffer are absent, the data packet being transmitted from the at least one sender buffer, the data packet being a speculative-data packet, such that precedence is given the credited mode of transmission over the speculative mode of transmission.

2. The method of claim 1, further comprising retransmitting a copy of at least one data packet to the at least one receiver buffer, wherein the at least one data packet is dropped by the receiver.

3. The method of claim 1, wherein a credit count of the sender is increased by a sufficient number in response to receiving one of the positive acknowledgement and the negative acknowledgement, wherein the credit count represents the available buffer space corresponding to the at least one receiver buffer, and the sender maintains a separate credit count corresponding to each receiver buffer, and a sender buffer can transmit a data packet destined for a destination port to a receiver buffer corresponding to the destination port when it is determined that at least one sender buffer has a sufficient number of credits corresponding to a receiver buffer among the multiple available receiver buffers.

4. The method of claim 3, wherein the credit count of the sender is decreased by a sufficient number in response to transmitting a data packet to the at least one receiver buffer, the data packet being one of a credited data packet and a speculative data packet.

5. The method of claim 1, wherein a data packet is dropped, if at least one predefined criterion is true, wherein the at least one predefined criteria comprise:
    a. the receiver buffer is full;
    b. the data packet is an out-of-order data packet; and
    c. the data packet is corrupted, wherein the data packet is one of a credited data packet and a speculative data packet.

6. The method of claim 5, wherein the receiver accepts the out-of-order data packet, the receiver re-sequences the out-of-order data packet to maintain an in-order state.

7. The method of claim 1, wherein a plurality of data packets in the sender buffer comprise:
    a. unsent data packets; and
    b. awaiting-acknowledgement data packets, each awaiting-acknowledgement data packet is one of a speculative-data packet and a credited-data packet, wherein the awaiting-acknowledgement data packets comprise at least one of:
        i. unacknowledged data packets, wherein a data packet is an unacknowledged data packet when a positive acknowledgment and a negative acknowledgment corresponding to the data packet is absent at the sender; and
        ii. negatively acknowledged data packets.

8. A method for flow control in a communication network, the method comprising:
    a. determining if at least one sender buffer has a sufficient number of credits, wherein the sufficient number of credits correspond to a receiver buffer, the sufficient number of credits informing if the receiver buffer has an available buffer space corresponding to at least one data packet, a sender buffer corresponds to a sender, the receiver buffer corresponds to a receiver;
    b. transmitting the at least one data packet to at least one receiver buffer, if the at least one sender buffer has the sufficient number of credits, the at least one data packet being transmitted from the at least one sender buffer, the at least one data packet being a credited-data packet; wherein a plurality of data packets in the sender comprise:
  i. unsent data packets; and
  ii. awaiting-acknowledgement data packets, each awaiting-acknowledgement data packet is one of a speculative-data packet and a credited-data packet, wherein the awaiting-acknowledgement data packets comprise at least one of:
    unacknowledged data packets, wherein a data packet is an unacknowledged data packet when a positive acknowledgment and a negative acknowledgment corresponding to the data packet is absent at the sender;
    negatively acknowledged data packets; and
  c. assigning a high priority to the negatively acknowledged data packets, assigning a medium priority to the unsent data packets and assigning a low priority to the unacknowledged data packets; and
  d. transmitting speculatively a data packet from the at least one sender buffer to the at least one receiver buffer if the sufficient number of credits in the at least one sender buffer are absent.

9. The method of claim 1, wherein a data packet is chosen for transmission from a plurality of data packets at the sender based on a predetermined policy, the predetermined policy being one of an oldest-cell-first policy and a round robin policy, the data packet being one of a speculative-data packet and a credited-data packet.

10. The method of claim 8, wherein a data packet is chosen for transmission from a plurality of data packets at the sender based on a predetermined policy, the predetermined policy being one of an oldest-cell-first policy and a round robin policy, the data packet being one of a speculative-data packet and a credited-data packet.

11. The method of claim 8, further comprising retransmitting a copy of at least one data packet to the at least one receiver buffer, wherein the at least one data packet is dropped by the receiver.

12. The method of claim 8, further comprising receiving one of a positive acknowledgement and a negative acknowledgement at the sender, wherein the positive acknowledgement is received when the receiver removes a data packet from the at least one receiver buffer, the negative acknowledgement is received when the data packet is dropped by the receiver, wherein each of the positive acknowledgement and the negative acknowledgement comprises an identification number corresponding to the data packet.

13. The method of claim 12, wherein a credit count of the sender is increased by a sufficient number in response to receiving one of the positive acknowledgement and the negative acknowledgement, wherein the credit count represents the available buffer space corresponding to the at least one receiver buffer, and the sender maintains a separate credit count corresponding to each receiver buffer.

14. The method of claim 13, wherein the credit count of the sender is decreased by a sufficient number in response to transmitting a data packet to the at least one receiver buffer, the data packet being one of a credited data packet and a speculative data packet.

15. The method of claim 8, wherein a data packet is dropped, if at least one predefined criterion is true, wherein the at least one predefined criterion comprises:
  a. the receiver buffer is full;
  b. the data packet is an out-of-order data packet; and
  c. the data packet is corrupted, wherein the data packet is one of a credited data packet and a speculative data packet.

16. The method of claim 15, wherein the receiver accepts the out-of-order data packet, and the receiver re-sequences the out-of-order data packet to maintain an in-order state.

17. A system for flow control in a communication network, the system comprising:
  a. a determining module configured to determine if at least one sender buffer has a sufficient number of credits, wherein the sufficient number of credits correspond to a receiver buffer, the sufficient number of credits informing if the receiver buffer has an available buffer space corresponding to at least one data packet, a sender buffer corresponds to a sender, and the receiver buffer corresponds to a receiver;
  b. a transmitting module configured for:
    i. transmitting the at least one data packet to at least one receiver buffer, if the at least one sender buffer has the sufficient number of credits, the at least one data packet being transmitted from the at least one sender buffer, the at least one data packet being a credited-data packet, wherein a plurality of data packets in the sender comprise:
      (1) unsent data packets; and
      (2) awaiting-acknowledgement data packets, each awaiting-acknowledgement data packet is one of a speculative-data packet and a credited-data packet, wherein the awaiting-acknowledgement data packets comprise at least one of:
        unacknowledged data packets, wherein a data packet is an unacknowledged data packet when a positive acknowledgment and a negative acknowledgment corresponding to the data packet is absent at the sender; and
        negatively acknowledged data packets; and
    the transmitting module being further configured for
    ii. assigning a high priority to the negatively acknowledged data packets, assigning a medium priority to the unsent data packets and assigning a low priority to the unacknowledged data packets; and
    ii. transmitting speculatively a data packet from at least one sender buffer to the at least one receiver buffer if the sufficient number of credits in the at least one sender buffer are absent, the data packet being transmitted as a speculative-data packet.

* * * * *